United States Patent
Kano

(10) Patent No.: US 10,460,430 B2
(45) Date of Patent: Oct. 29, 2019

(54) IMAGE PROCESSING APPARATUS AND METHOD FOR DETECTING AND REDUCING AN UNNECESSARY LIGHT COMPONENT IN AN IMAGE BASED ON MULTIPLE VIEWPOINTS

(71) Applicant: CANON KABUSHIKI KAISHA, Tokyo (JP)

(72) Inventor: Akira Kano, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 52 days.

(21) Appl. No.: 15/682,680

(22) Filed: Aug. 22, 2017

(65) Prior Publication Data

US 2018/0089813 A1 Mar. 29, 2018

(30) Foreign Application Priority Data

Sep. 23, 2016 (JP) .................... 2016-185868

(51) Int. Cl.
*G06K 9/00* (2006.01)
*G06T 5/50* (2006.01)

(52) U.S. Cl.
CPC ...................... *G06T 5/50* (2013.01)

(58) Field of Classification Search
CPC .......... G06T 5/002; G06T 5/003; G06T 3/40; G06T 2207/10004; G06T 5/50
See application file for complete search history.

(56) References Cited

U.S. PATENT DOCUMENTS

| 4,982,342 A * | 1/1991 | Moribe | G06F 1/03 382/307 |
| 2003/0113000 A1* | 6/2003 | Hyoki | G06K 9/036 382/112 |
| 2016/0292823 A1* | 10/2016 | Nagumo | H04N 13/271 |
| 2017/0096106 A1* | 4/2017 | Higuchi | B60R 1/00 |
| 2017/0154408 A1* | 6/2017 | Jobara | G06T 5/003 |
| 2017/0208311 A1* | 7/2017 | Wachi | G06T 5/005 |

FOREIGN PATENT DOCUMENTS

| JP | 2008-054206 A | 3/2008 |
| JP | 5284306 B2 | 9/2013 |

* cited by examiner

*Primary Examiner* — Amir Alavi
(74) *Attorney, Agent, or Firm* — Cowan, Liebowitz & Latman, P.C.

(57) ABSTRACT

An image processing apparatus, comprising: one or more processors; and a memory storing instructions which, when the instructions are executed by the processors, cause the image processing apparatus to function as: a detection unit configured to detect an unnecessary component generating region, which is a region of an image in which an unnecessary component is generated, based on a first viewpoint image and a second viewpoint image with different viewpoints, the image being obtained by combining the first viewpoint image and the second viewpoint image, the detection unit being configured to detect the unnecessary component generating region based on a plurality of correlation values between a first region of interest in the first viewpoint image and a plurality of second regions of interest in the second viewpoint image; and a reduction unit configured to perform processing of reducing the unnecessary component.

13 Claims, 14 Drawing Sheets

IMAGE PROCESSING APPARATUS AND METHOD FOR DETECTING AND REDUCING AN UNNECESSARY LIGHT COMPONENT IN AN IMAGE BASED ON MULTIPLE VIEWPOINTS

BACKGROUND OF THE INVENTION

Field of the Invention

This disclosure relates to an image processing apparatus, an image processing method, and a recording medium.

Description of the Related Art

There are cases where a part of light entering a lens forming an image pickup optical system is reflected by an interface of the lens or a member holding the lens, to thereby reach an image pickup surface. Such unnecessary light generates an unnecessary component, for example, ghost or flare, in an image. There are also cases where, when a diffractive optical element is used to correct axial chromatic aberration and lateral chromatic aberration, light from an object having a high luminance and being located outside an image pickup field angle, for example, the sun, is diffracted by the diffractive optical element to generate the unnecessary component in the image. Under such circumstances, there have been proposed methods for reducing the unnecessary light. In Japanese Patent Application Laid-Open No. 2008-54206, there is disclosed a method of detecting ghost based on a difference between an image in a focused state and an image in a de-focused state. Further, in Japanese Patent No. 5284306, there is disclosed a method of detecting ghost by comparing a plurality of viewpoint images taken by single-lens stereoscopic imaging.

However, in the related art, there have been cases where the unnecessary component cannot always be reduced satisfactorily, and where a large processing load is generated.

SUMMARY OF THE INVENTION

According to an aspect of an embodiment, there is provided an image processing apparatus, comprising: one or more processors; and a memory storing instructions which, when the instructions are executed by the processors, cause the image processing apparatus to function as: a detection unit configured to detect an unnecessary component generating region, which is a region of an image in which an unnecessary component is generated, based on a first viewpoint image and a second viewpoint image with different viewpoints, the image being obtained by combining the first viewpoint image and the second viewpoint image, the detection unit being configured to detect the unnecessary component generating region based on a plurality of correlation values between a first region of interest in the first viewpoint image and a plurality of second regions of interest in the second viewpoint image; and a reduction unit configured to perform processing of reducing the unnecessary component.

According to another aspect of an embodiment, there is provided an image processing method, comprising: detecting an unnecessary component generating region, which is a region of an image in which an unnecessary component is generated, based on a first viewpoint image and a second viewpoint image with different viewpoints, the image being obtained by combining the first viewpoint image and the second viewpoint image, the unnecessary component generating region being detected based on a plurality of correlation values between a first region of interest in the first viewpoint image and a plurality of second regions of interest in the second viewpoint image, which are located in a vicinity of a region corresponding to the first region of interest; and performing processing of reducing the unnecessary component.

According to further another aspect of an embodiment, there is provided a non-transitory computer-readable storage medium having stored thereon a program for causing a computer to execute: detecting an unnecessary component generating region, which is a region of an image in which an unnecessary component is generated, based on a first viewpoint image and a second viewpoint image with different viewpoints, the image being obtained by combining the first viewpoint image and the second viewpoint image, the unnecessary component generating region being detected based on a plurality of correlation values between a first region of interest in the first viewpoint image and a plurality of second regions of interest in the second viewpoint image, which are located in a vicinity of a region corresponding to the first region of interest; and performing processing of reducing the unnecessary component.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

[First Embodiment]

An image processing apparatus and an image processing method according to a first embodiment of this disclosure are described with reference to FIG. 1 to FIG. 14. An image processing apparatus 100 according to the first embodiment is an image pickup apparatus capable of taking a plurality of images having parallax therebetween, that is, a plurality of viewpoint images, for example. Here, there is described, as an example, a case where the image processing apparatus 100 is an image pickup apparatus, that is, a case where the image processing apparatus 100 includes an image pickup element 102, but the image processing apparatus 100 may include no image pickup element 102. In other words, the image processing apparatus 100 may perform image processing using a plurality of viewpoint images taken by an image pickup apparatus that is separate from the image processing apparatus 100.

Figure 1:
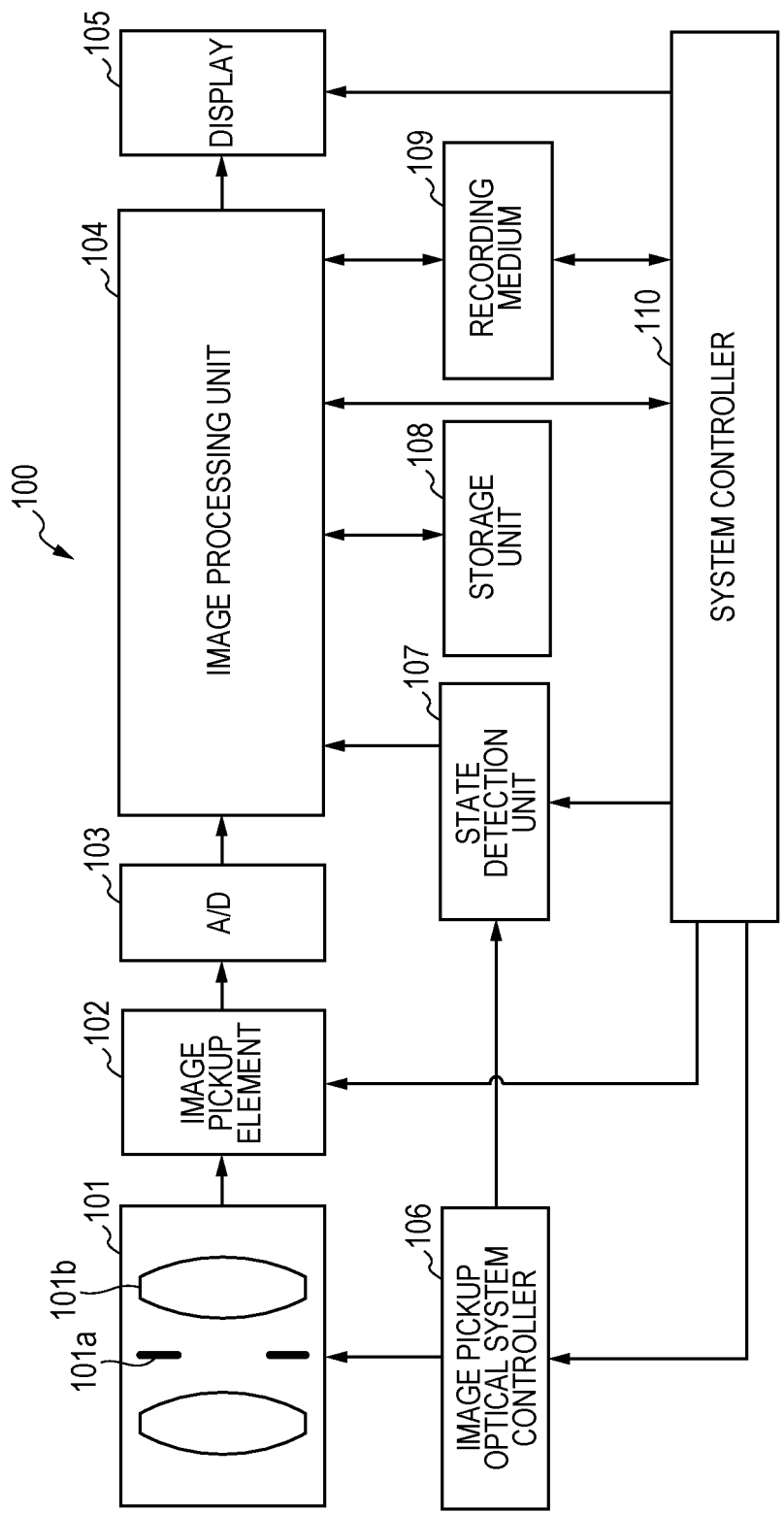
FIG. 1 is a block diagram for illustrating an image processing apparatus according to a first embodiment of this disclosure.
Figure 2:
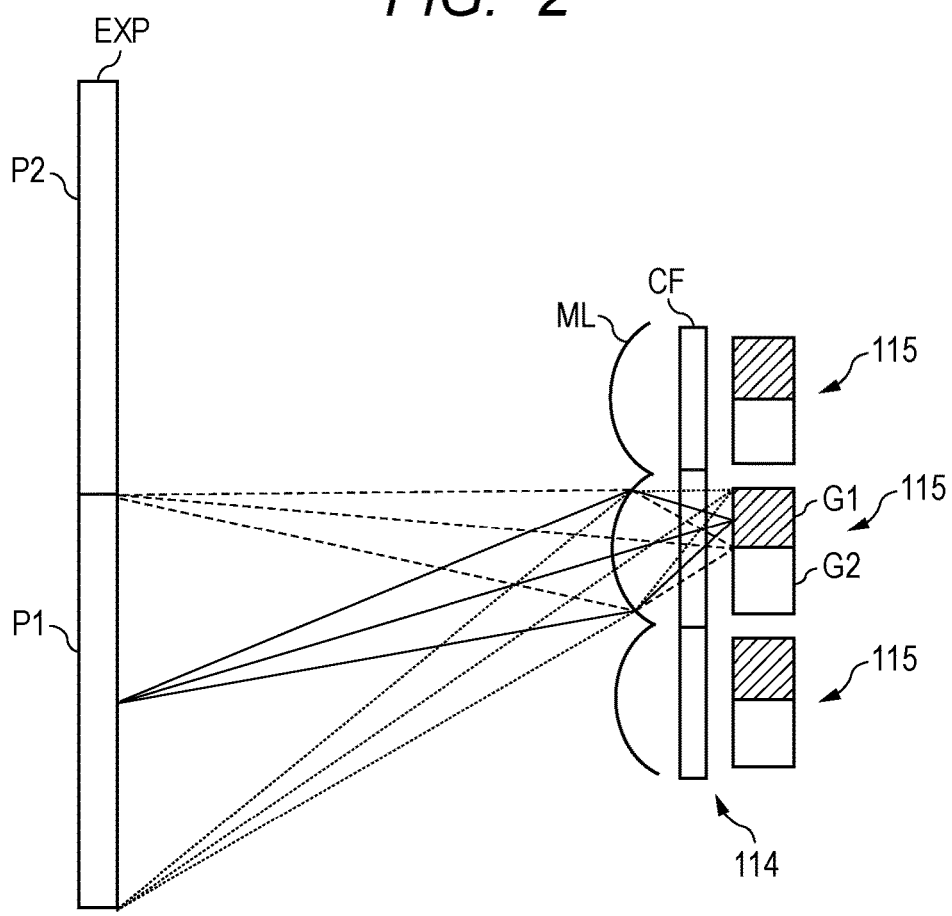
FIG. 2 is a diagram for illustrating a relationship between pupil regions of an image pickup optical system and a light receiving portion of an image pickup element.

FIG. 2 is a diagram for illustrating a relationship between pupil regions of an image pickup optical system and a light receiving portion of the image pickup element. An exit pupil EXP of an image pickup optical system 101 (see FIG. 1) includes a plurality of mutually different pupil regions, that is, a first pupil region P1 and a second pupil region P2. In a light receiving portion (light receiving surface) 114 of the image pickup element 102, unit pixels (pixel pairs) 115, each of which includes a plurality of pixels (photoelectric converters, divided pixels, subpixels), that is, a first pixel G1 and a second pixel G2, are arranged in matrix. In other words, in the light receiving portion 114 of the image pickup element 102, there is provided a pixel array in which the plurality of unit pixels 115 are arranged in matrix. A color filter CF is arranged above each of the unit pixels 115, and a microlens ML is arranged above the color filter CF. The first pixel G1 and the second pixel G2 included in one unit pixel 115 form a pair. In other words, the first pixel G1 and the second pixel G2 included in the one unit pixel 115 share one microlens ML corresponding to the unit pixel 115. The first pixel G1 and the second pixel G2 forming the pair have a conjugate relationship with the exit pupil EXP via the microlens ML. In this manner, light fluxes that pass through the mutually different pupil regions P1 and P2 of the exit pupil EXP of the image pickup optical system 101 are guided to the mutually different pixels G1 and G2 arranged in the image pickup element 102, respectively, to be photoelectrically converted in those pixels G1 and G2, respectively.

Figure 3:
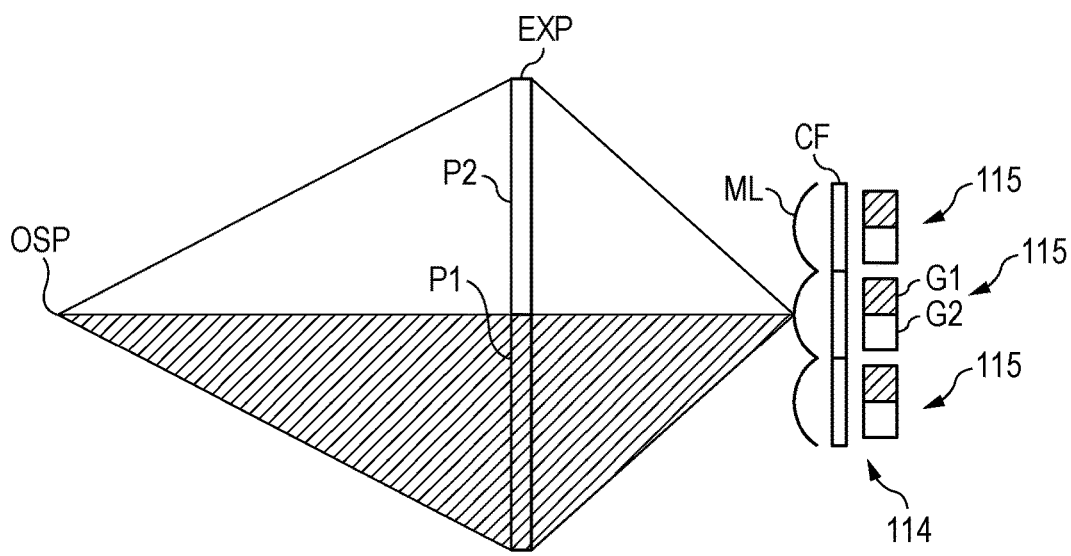
FIG. 3 is a diagram for illustrating a relationship between the pupil regions of the image pickup optical system and the light receiving portion of the image pickup element.

FIG. 3 is a diagram for illustrating a relationship between the pupil regions of the image pickup optical system and the light receiving portion of the image pickup element. In FIG. 3, there is illustrated a case where it is assumed that a thin lens is provided at the position of the exit pupil EXP. The first pixel G1 receives the light flux that has passed through the first pupil region P1 of the exit pupil EXP. The second pixel G2 receives the light flux that has passed through the second pupil region P2 of the exit pupil EXP. There is no need for an object to be always present at an object point OSP. The light flux that passes through the pupil region P1 of the light fluxes from the object point OSP enters the first pixel G1. The light flux that passes through the pupil region P2 of the light fluxes from the object point OSP enters the second pixel G2. Receiving of the light fluxes that have passed through the mutually different pupil regions P1 and P2 of the exit pupil EXP by the mutually different pixels G1 and G2 included in the unit pixel 115 is called "pupil division". The light fluxes that pass through the mutually different pupil regions P1 and P2 enter those pixels G1 and G2, respectively, and hence parallax is generated between an image generated using a signal from the first pixels G1 and an image generated using a signal from the second pixels G2. In this specification, the image generated using the signal from a plurality of the first pixels G1 (first pixel group) is referred to as a first viewpoint image. Similarly, the image generated using the signal from a plurality of the second pixels G2 (second pixel group) is referred to as a second viewpoint image.

There are cases where the above-mentioned conjugate relationship may become incomplete due to a positional deviation of the exit pupil EXP and other such causes. There are also cases where the first pupil region P1 and the second pupil region P2 included in the exit pupil EXP partially overlap with each other. Also in such cases, parallax is generated between the image generated by the signal from the pixels G1 and the image generated by the signal from the pixels G2. Therefore, the above-mentioned conjugate relationship does not always need to be complete. Moreover, the first pupil region P1 and the second pupil region P2 included in the exit pupil EXP may partially overlap with each other.

FIG. 1 is a block diagram for illustrating the image processing apparatus according to the first embodiment. The image pickup optical system 101 forms an optical image, that is, an object image from an object (not shown) on the light receiving portion 114 of the image pickup element 102. As the image pickup element 102, a charge-coupled device (CCD) image sensor or a complementary metal oxide semiconductor (CMOS) image sensor is used, for example. The image pickup element 102 receives the light fluxes that pass through the mutually different pupil regions P1 and P2 of the exit pupil EXP with the pixels G1 and G2, respectively. The image pickup element 102 photoelectrically converts the object image and outputs an analog image signal. An A/D converter 103 converts the analog image signal output from the image pickup element 102 into a digital image signal, and outputs the digital image signal to an image processing unit 104.

The image processing unit 104 performs image processing on the digital image signal from the A/D converter 103. As the image processing unit 104, a digital signal processor (DSP) is used, for example. As described later, the image processing unit 104 acquires a plurality of viewpoint images with different viewpoints, specifically, a first viewpoint image 117a (see FIG. 7A) and a second viewpoint image 117b (see FIG. 7B). As described later, the first viewpoint image 117a is an image corresponding to a first image signal obtained by the plurality of first pixels G1. Similarly, as described later, the second viewpoint image 117b is an image corresponding to a second image signal obtained by the plurality of second pixels G2. As described later, the image processing unit 104 detects an unnecessary component generating region GST, which is a region of an image 117 (see FIG. 6) in which an unnecessary component is generated, based on the plurality of viewpoint images 117a and 117b, the image 117 corresponding to a combined signal of the first image signal and the second image signal. As described later, the image processing unit 104 detects the unnecessary component generating region GST based on a plurality of correlation values between a first region of interest ra in the first viewpoint image 117a and a plurality of second regions of interest rb in the second viewpoint image 117b (see FIG. 11A and FIG. 11B). As described later, the plurality of second regions of interest rb are set by sequentially shifting the second region of interest rb in a predetermined range including a region corresponding to the first region of interest ra. As such correlation value, a sum of absolute differences (SAD) is used, for example. More specifically, a sum of absolute differences SAD between a portion located in the first region of interest ra of the first viewpoint image 117a and a portion located in the second region of interest rb of the second viewpoint image 117b is used as such correlation value, for example. As described later, the image processing unit 104 detects the unnecessary component generating region GST based on comparison between the plurality of correlation values and a threshold value THR. As described later, the threshold value THR is set based on a contrast in the first region of interest ra. Alternatively, as described later, the threshold value THR is set based on an average value of pixel values in the first region of interest ra. Still alternatively, as described later, the threshold value THR is set based on an ISO sensitivity at the time of photography. In this manner, the image processing unit 104 serves as a detection unit configured to detect the unnecessary component generating region GST. The image processing unit 104 also serves as a reduction unit configured to perform processing of reducing the unnecessary component. As described later, the image processing unit 104 selectively performs the processing of reducing the unnecessary component on the unnecessary component generating region GST. As described later, the image processing unit 104 reduces the unnecessary component so that a degree of reduction of the unnecessary component is gradually changed at a boundary between the unnecessary component generating region GST and an unnecessary component non-generating region, which is a region in which the unnecessary component is not generated. The image processing unit 104 also performs general image processing, for example, gamma correction and color balancing, on the image in which the unnecessary component has been reduced, to thereby generate an image file in a predetermined file format. The image processing unit 104 detects the unnecessary component generating region GST based on the first viewpoint image 117a and the second viewpoint image 117b, on which correction of an image shift depending on the parallax has not been performed. Examples of the predetermined file format include the Joint Photographic Experts Group (JPEG) format.

The image file (image data) generated by the image processing unit 104 is stored in a recording medium 109. Examples of the recording medium 109 include a semiconductor memory and an optical disc. The recording medium 109 may or may not be detachable from the image processing apparatus 100. Further, an image output from the image processing unit 104 may be displayed by a display 105. A storage unit (memory) 108 stores an image processing program, which is required for the image processing performed by the image processing unit 104, and various kinds of information. The storage unit 108 includes a random access memory (RAM) and a read only memory (ROM), for example.

A system controller (controller) 110 is configured to control the image pickup element 102 and control the image processing unit 104. As the system controller 110, a central processing unit (CPU) is used, for example. The system controller 110 is also configured to control a diaphragm 101a and a focus lens 101b included in the image pickup optical system 101 via an image optical system controller 106. The image optical system controller 106 controls an aperture diameter of the diaphragm 101a based on an aperture value (f-number) specified by the system controller 110. The image optical system controller 106 also adjusts the focus lens 101b to be focused on an object based on an instruction from the system controller 110 (autofocus). A user may manually operate the focus lens 101b to be focused on the object (manual focus). A state detection unit 107 is configured to acquire current photographic conditions and other such information in response to an instruction from the system controller 110. The image pickup optical system 101 may or may not be detachable from a main body (body) of the image processing apparatus 100.

Figure 4A:
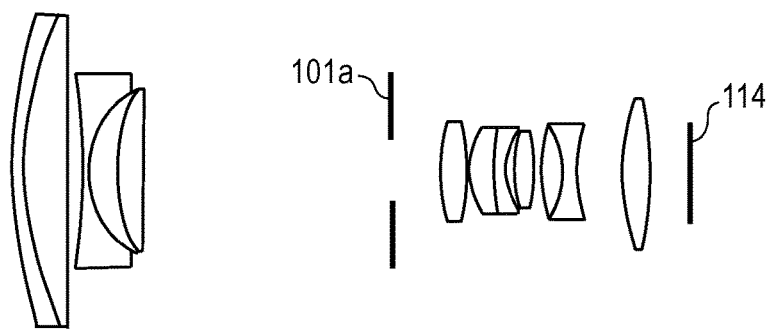
FIG. 4A and FIG. 4B are diagrams for illustrating the structure of the image pickup optical system and unnecessary light.
Figure 4B:
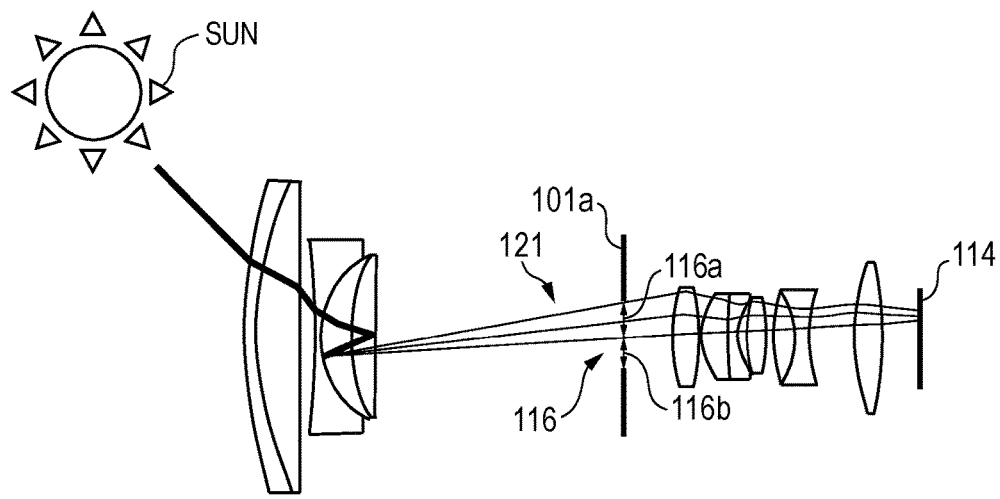

FIG. 4A and FIG. 4B are diagrams for illustrating the structure of the image pickup optical system 101 and unnecessary light. In FIG. 4A, there is illustrated a state in which unnecessary light does not enter the image pickup element 102, and in FIG. 4B, there is illustrated a state in which unnecessary light enters the image pickup element 102. As illustrated in FIG. 4B, strong light from the sun SUN, which is an object having a high luminance, enters lenses forming the image pickup optical system 101, and light reflected by interfaces of the lenses, that is, unnecessary light 121 reaches the light receiving portion 114 of the image pickup element 102. The unnecessary light 121 generates the unnecessary component, for example, ghost or flare, in an image. Here, as illustrated in FIG. 4B, there is described, as an example, a case where the unnecessary light 121 passes through a first portion 116a of the aperture 116 of the diaphragm 101a, while the unnecessary light 121 does not pass through a second portion 116b of the aperture 116 of the diaphragm 101a.

Figure 5:
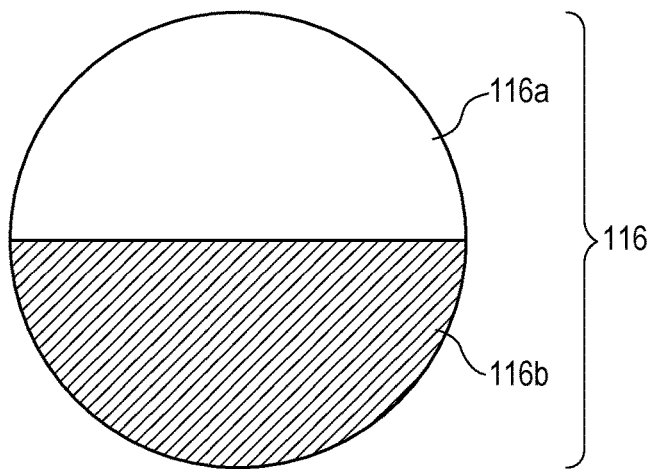
FIG. 5 is a diagram for conceptually illustrating an aperture of a diaphragm.

FIG. 5 is a diagram for conceptually illustrating the aperture 116 of the diaphragm 101a. The first portion 116a of the aperture 116 of the diaphragm 101a corresponds to the first pupil region P1 of the exit pupil EXP. Meanwhile, the second portion 116b of the aperture 116 of the diaphragm 101a corresponds to the second pupil region P2 of the exit pupil EXP. The aperture 116 of the diaphragm 101a and the exit pupil EXP of the image pickup optical system 101 are different in a strict sense. As described above, the unnecessary light 121 passes through the first portion 116a of the aperture 116 of the diaphragm 101a. As described above, the first portion 116a corresponds to the first pupil region P1. Moreover, as described above, the first pixel G1 receives the light flux that passes through the first pupil region P1. Therefore, the unnecessary light 121 reaches the first pixel G1. Meanwhile, as described above, the unnecessary light 121 does not pass through the second portion 116b of the aperture 116 of the diaphragm 101a. As described above, the second portion 116b corresponds to the second pupil region P2. Moreover, as described above, the second pixel G2 receives the light flux that passes through the second pupil region P2. Therefore, the unnecessary light 121 does not reach the second pixel G2. In this manner, in the example illustrated in FIG. 4A and FIG. 4B, the unnecessary light 121 reaches the first pixel G1, but does not reach the second pixel G2.

Figure 6:
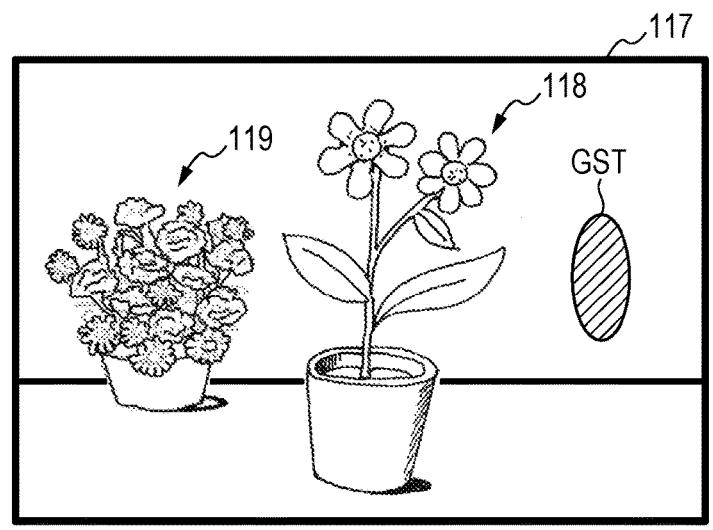
FIG. 6 is a diagram for illustrating an example of an image taken by photography.

FIG. 6 is a diagram for illustrating an example of an image taken by photography. The image illustrated in FIG. 6 is generated from a combined signal obtained by combining the image signal acquired by the first pixels G1 and the image signal acquired by the second pixels G2, for example. As illustrated in FIG. 6, in an image 117, objects 118 and 119, that is, flowers are arranged in the front center and in the back left, respectively. Moreover, in the image 117, the unnecessary component generating region GST, that is, a region in which ghost or the like is generated is present. In the unnecessary component generating region GST, the unnecessary component overlaps with the object, and hence a pixel value (luminance) in the unnecessary component generating region GST is higher than an original pixel value of the object.

Figure 7A:
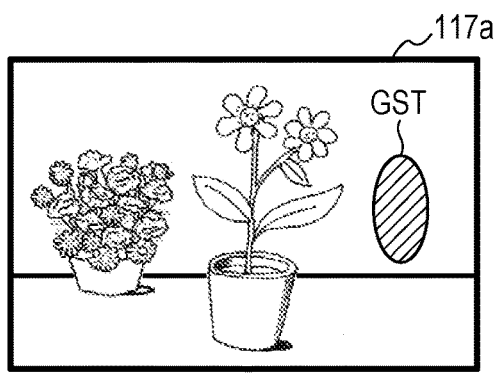
FIG. 7A and FIG. 7B are diagrams for illustrating examples of viewpoint images.
Figure 7B:
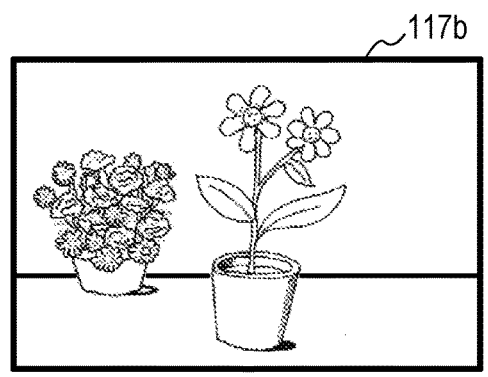

FIG. 7A and FIG. 7B are diagrams for illustrating examples of the viewpoint images. In FIG. 7A, the first viewpoint image 117a is illustrated, and in FIG. 7B, the second viewpoint image 117b is illustrated. The first viewpoint image 117a illustrated in FIG. 7A is an image obtained by photoelectrically converting the light fluxes that pass through the first pupil region P1 by the first pixel group formed of the plurality of first pixels G1. As described above, the unnecessary light 121 reaches the first pixel G1. Therefore, the first viewpoint image 117a illustrated in FIG. 7A includes the unnecessary component generating region GST, that is, the region in which ghost or the like is generated. Meanwhile, the second viewpoint image 117b illustrated in FIG. 7B is an image obtained by photoelectrically converting the light fluxes that pass through the second pupil region P2 by the second pixel group formed of the plurality of second pixels G2. As described above, the unnecessary light 121 does not reach the second pixel G2. Therefore, the second viewpoint image 117b illustrated in FIG. 7B does not include the unnecessary component generating region GST. The first pixel G1 and the second pixel G2 are arranged to be adjacent to each other in a horizontal direction, and hence parallax in the left-and-right direction is generated between the first viewpoint image 117a illustrated in FIG. 7A and the second viewpoint image 117b illustrated in FIG. 7B. Moreover, here, there is described, as an example, a case where the number of unnecessary component generating regions GST is one, but the unnecessary component generating regions GST may be present at a plurality of spots in an image. Moreover, the unnecessary component generating regions GST may overlap with each other in an image. At a spot at which unnecessary components overlap with each other, a pixel value (luminance) becomes higher than at a spot at which unnecessary components do not overlap with each other. There are a difference corresponding to the unnecessary component and a difference corresponding to an angular difference (amount of parallax) in a line-of-sight direction, that is, a difference corresponding to the parallax between the first viewpoint image 117a illustrated in FIG. 7A and the second viewpoint image 117b illustrated in FIG. 7B.

Figure 8:
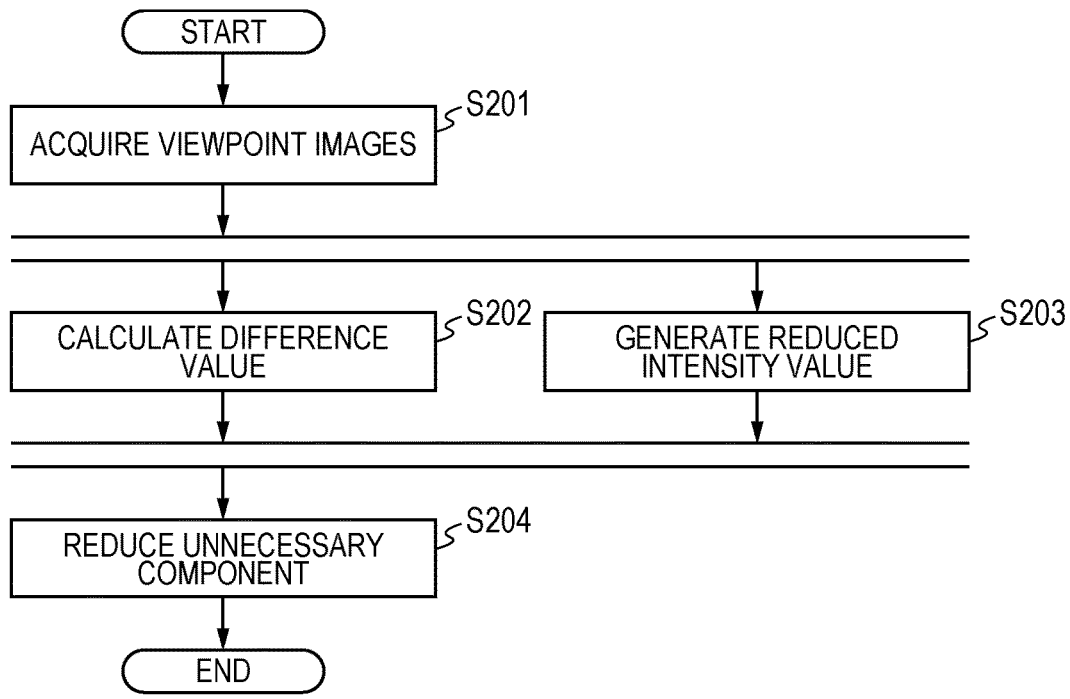
FIG. 8 is a flow chart for illustrating an operation of the image processing apparatus according to the first embodiment.

FIG. 8 is a flow chart for illustrating an operation of the image processing apparatus according to the first embodiment.

In Step S201, the image processing unit 104 acquires the plurality of viewpoint images having parallax therebetween (having different viewpoints), that is, the first viewpoint image 117a and the second viewpoint image 117b. The image processing unit 104 performs general development processing and various kinds of correction processing on each of the first viewpoint image 117a and the second viewpoint image 117b. After Step S201, Step S202 and Step S203 are performed in parallel.

In Step S202, the image processing unit 104 calculates a difference value between the first viewpoint image 117a and the second viewpoint image 117b. More specifically, the image processing unit 104 calculates an absolute value of a difference between the first viewpoint image 117a and the second viewpoint image 117b for each set of coordinates. When a pixel value at each set of coordinates of the first viewpoint image 117a is represented by A(x,y), a pixel value at each set of coordinates of the second viewpoint image 117b is represented by B(x,y), and a difference value at each set of coordinates is represented by DIFF(x,y), a relationship expressed as the following expression (1) is established:

$$\mathrm{DIFF}(x,y) = |A(x,y) - B(x,y)| \qquad (1).$$

Figure 9:
FIG. 9 is a diagram for illustrating an example of a difference value map.

FIG. 9 is a diagram for illustrating an example of a difference value map. A difference value map 117c illustrated in FIG. 9 is obtained by two-dimensionally mapping the difference value DIFF(x,y) at each set of coordinates between the first viewpoint image 117a illustrated in FIG. 7A and the second viewpoint image 117b illustrated in FIG. 7B. In the difference value map 117c, the difference corresponding to the unnecessary component and the difference corresponding to the parallax appear. The object 118 in the front of the two objects 118 and 119 included in the image 117 illustrated in FIG. 6 is in focus, and hence the difference corresponding to the parallax does not appear conspicuously in a portion corresponding to the object 118. Meanwhile, the object 119 located in the back left of the two objects 118 and 119 included in the image 117 illustrated in FIG. 6 is out of focus, and hence the difference corresponding to the parallax appears conspicuously in a portion corresponding to the object 119.

Figure 10:
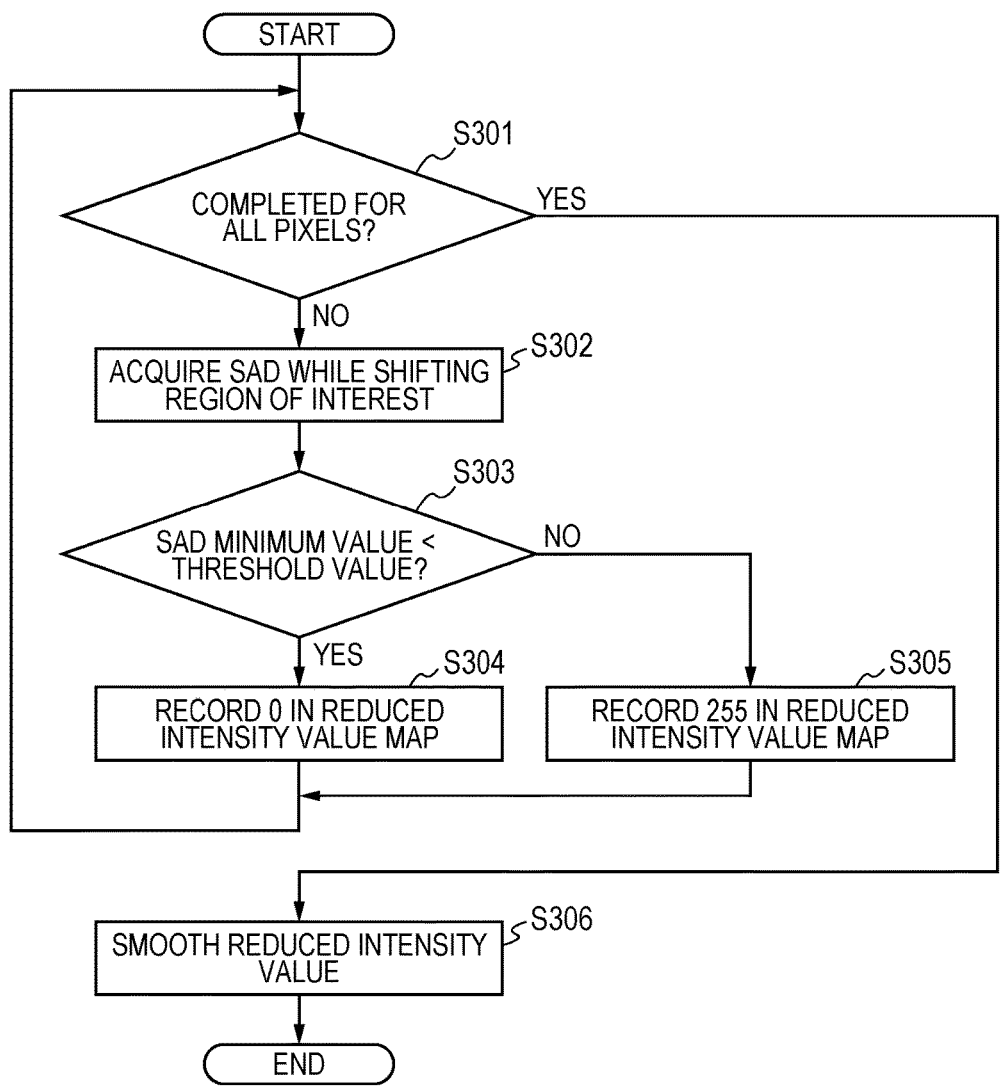
FIG. 10 is a flow chart for illustrating an operation of the image processing apparatus according to the first embodiment.

In Step S203, the image processing unit 104 generates a reduced intensity value, which indicates a reduced intensity of the unnecessary component, based on the first viewpoint image 117a and the second viewpoint image 117b. FIG. 10 is a flow chart for illustrating an operation of the image processing apparatus according to the first embodiment. In FIG. 10, there is illustrated processing of generating the reduced intensity value, which is performed by the image processing apparatus according to the first embodiment. The processing of generating the reduced intensity value is sequentially performed for each of a plurality of pixels included in an image. In Step S301, the image processing unit 104 determines whether or not the processing of generating the reduced intensity value has been completed for all pixels. When the processing of generating the reduced intensity value has not been completed for all pixels (NO in Step S301), the processing proceeds to Step S302. Meanwhile, when the processing of generating the reduced intensity value has been completed for all pixels (YES in Step S301), the processing proceeds to Step S306.

Figure 11A:
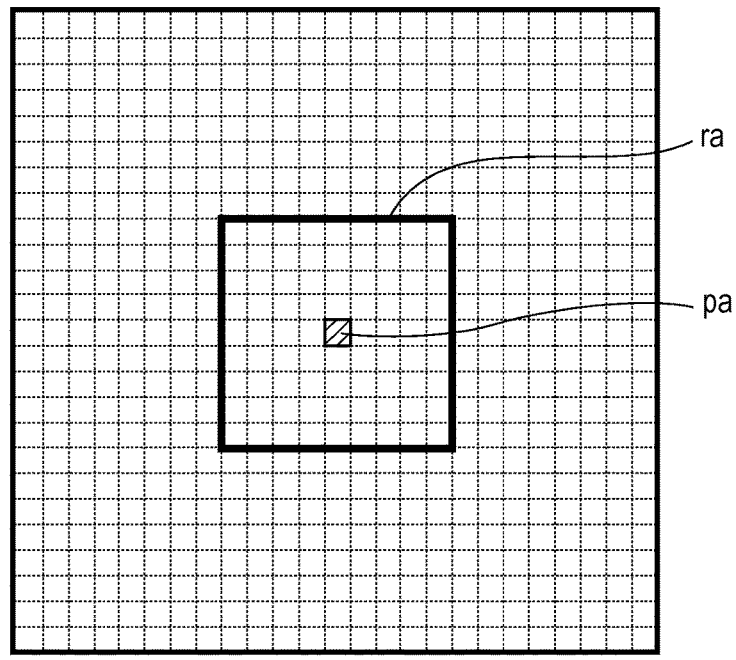
FIG. 11A and FIG. 11B are diagrams for each illustrating a pixel of interest and a region of interest.
Figure 11B:
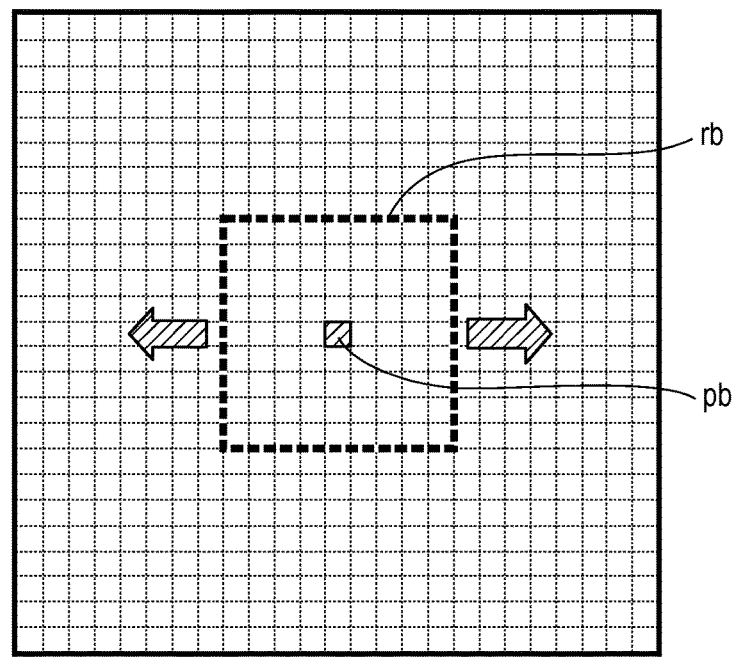

FIG. 11A and FIG. 11B are diagrams for each illustrating a pixel of interest and a region of interest. In FIG. 11A, a part of the first viewpoint image 117a is illustrated while being enlarged, and one square in FIG. 11A corresponds to one pixel. A first pixel of interest pa is a pixel that is a current target of the processing of generating the reduced intensity value of a plurality of pixels included in the first viewpoint image 117a. The first region of interest ra is set in the first viewpoint image 117a with the first pixel of interest pa being the center. Here, the first region of interest ra has a size of 9 pixels by 9 pixels. However, the size of the first region of interest ra is not limited thereto, and may be set as appropriate. In FIG. 11B, a part of the second viewpoint image 117b is illustrated while being enlarged, and one square in FIG. 11B corresponds to one pixel. A set of coordinates of a second pixel of interest pb illustrated in FIG. 11B corresponds to a set of coordinates of the first pixel of interest pa illustrated in FIG. 11A. Moreover, a position of the second region of interest rb illustrated in FIG. 11B corresponds to a position of the first region of interest ra illustrated in FIG. 11A. The size of the second region of interest rb is set to be equivalent to the size of the first region of interest ra.

In Step S302, the image processing unit 104 acquires the sum of absolute differences SAD between the portion in the first region of interest ra of the first viewpoint image 117a and the portion in the second region of interest rb of the second viewpoint image 117b while shifting the second region of interest rb. More specifically, the sum of absolute differences SAD between a pixel value of each of a plurality of pixels located in the first region of interest ra and a pixel value of each of a plurality of pixels located in the second region of interest rb is acquired. A direction of shifting the second region of interest rb is a direction in which the parallax is generated between the first viewpoint image 117a and the second viewpoint image 117b, that is, the left-and-right direction in this example. The arrows illustrated in FIG. 11B indicate directions of shifting the second region of interest rb.

Figure 12A:
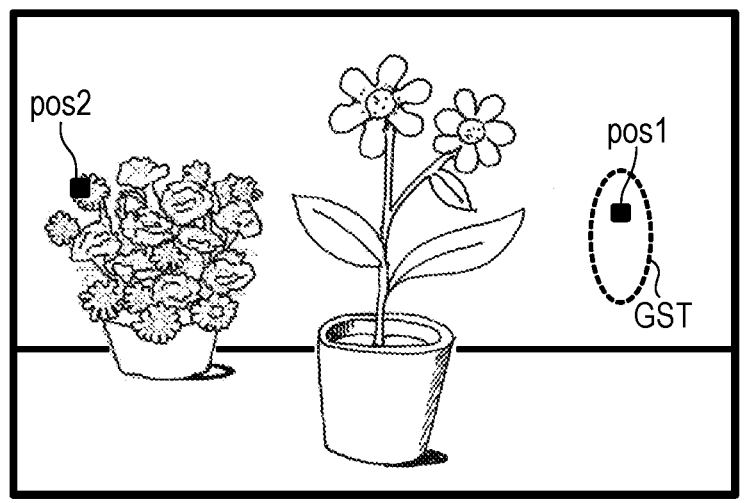
FIG. 12A, FIG. 12B, FIG. 12C, and FIG. 12D are diagrams for illustrating examples of a sum of absolute differences.
Figure 12B:
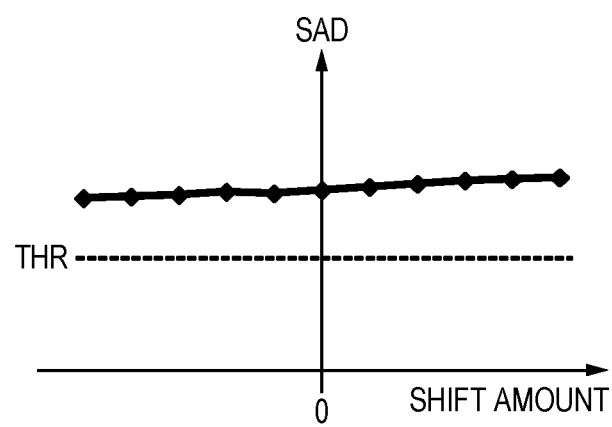
Figure 12C:
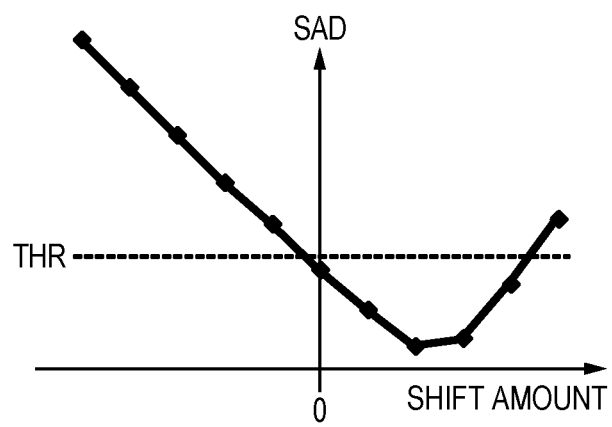

FIG. 12A to FIG. 12D are diagrams for illustrating examples of results of calculating the sum of absolute differences SAD. FIG. 12A is a diagram for illustrating a first set of coordinates pos1 and a second set of coordinates pos2 in an image. In FIG. 12B, there is illustrated an example of a result of calculating the sum of absolute differences SAD when the first pixel of interest pa is located at the first set of coordinates pos1. In FIG. 12C, there is illustrated an example of a result of calculating the sum of absolute differences SAD when the first pixel of interest pa is located at the second set of coordinates pos2. The horizontal axis in each of FIG. 12B and FIG. 12C indicates a shift amount of the second region of interest rb. When the set of coordinates of the first pixel of interest pa and the set of coordinates of the second pixel of interest pb is the same, the shift amount indicated by the horizontal axis in FIG. 12B and FIG. 12C is 0.

As illustrated in FIG. 12A, the first set of coordinates pos1 is located in the unnecessary component generating region GST. Therefore, when the first pixel of interest pa is located at the first set of coordinates pos1, the first pixel of interest pa is located in the unnecessary component generating region GST. Here, there is described, as an example, a case where the object is flat in the vicinity of the first set of coordinates pos1. A difference generated between the portion in the first region of interest ra of the first viewpoint image 117a and the portion in the second region of interest rb of the second viewpoint image 117b is mainly caused by the unnecessary component, and not by the parallax. Therefore, in a case where the first pixel of interest pa is located at the first set of coordinates pos1, as illustrated in FIG. 12B, even when the second region of interest rb is shifted within the predetermined range, the sum of absolute differences SAD is hardly changed. Moreover, even when the second region of interest rb is shifted within the predetermined range, the sum of absolute differences SAD does not fall below the threshold value THR as illustrated in FIG. 12B. Meanwhile, in a case where the first pixel of interest pa is located at the second set of coordinates pos2, a difference caused by the parallax is generated conspicuously between the first viewpoint image 117a and the second viewpoint image 117b. Therefore, when the second region of interest rb is shifted, the sum of absolute differences SAD varies significantly, and falls below the threshold value THR. In this manner, in a case where the first pixel of interest pa is located in the unnecessary component generating region GST, that is, in a case where the first region of interest ra is located in the unnecessary component generating region GST, the following result is generated. Specifically, there is a low correlation between the pixel values in the first region of interest ra and the pixel values in the second region of interest rb, and hence the sum of absolute differences SAD becomes higher than the threshold value THR. In addition, even when the second region of interest rb is shifted within the predetermined range, the sum of absolute differences SAD does not fall below the threshold value THR. Therefore, even when the second region of interest rb is shifted within the predetermined range, and when the sum of absolute differences SAD does not fall below the threshold value THR, it can be determined that the first pixel of interest pa is located within the unnecessary component generating region GST.

In Step S303, the image processing unit 104 determines whether or not a minimum value of the sums of absolute differences SAD obtained when the second region of interest rb is shifted within the predetermined range is lower than the threshold value THR. When the minimum value of the sums of absolute differences SAD obtained when the second region of interest rb is shifted within the predetermined range is lower than the threshold value THR (YES in Step S303), it is considered that the first pixel of interest pa is not located within the unnecessary component generating region GST. In such case, it is considered that there is no need to perform the processing of reducing the unnecessary component, and hence a reduced intensity for the first pixel of interest pa is set to 0, for example. In this case, a reduced intensity value DEC(x,y) at the set of coordinates of the first pixel of interest pa is expressed as follows:

$$DEC(x,y)=0 \quad (2).$$

In Step S304, the image processing unit 104 records 0 as a reduced intensity value for the first pixel of interest pa in a reduced intensity value map. The reduced intensity value map is obtained by two-dimensionally mapping the reduced intensity value DEC(x,y) for each first pixel of interest pa. When the minimum value of the sums of absolute differences SAD obtained when shifting the second region of interest rb within the predetermined range is the threshold value THR or more (NO in Step S303), it is considered that the first pixel of interest pa is located in the unnecessary component generating region GST. In this case, it is considered that there is a need to perform the processing of reducing the unnecessary component, and hence a reduced intensity for the first pixel of interest pa is set to 255, for example. In this case, the reduced intensity value DEC(x,y) at the set of coordinates of the first pixel of interest pa is expressed as follows:

$$DEC(x,y)=255 \quad (3).$$

In Step S305, the image processing unit 104 records 255 as the reduced intensity for the first pixel of interest pa in the reduced intensity value map.

A portion in which the reduced intensity value is 0 in the reduced intensity value map corresponds to the region in which the unnecessary component is not generated. A portion in which the reduced intensity is 255 in the reduced intensity value map corresponds to the unnecessary component generating region GST. Such reduced intensity value map is stored in the storage unit 108, for example. Here, there has been described, as an example, the case where the reduced intensity value is set to 0 or 255. However, the reduced intensity value is not limited thereto, and may be set as appropriate.

The threshold value THR is set based on the following expression (4), for example:

$$THR = K \times CNT \times AVR + OFS \quad (4).$$

In the expression (4), K represents an adjustment factor. CNT represents a contrast in the first region of interest ra, for example, a difference between a maximum value and a minimum value of the pixel values of the pixels located in the first region of interest ra. AVR represents an average value of the pixel values of the pixels located in the first region of interest ra. OFS represents an offset value, and is set depending on the ISO sensitivity at the time when an image is taken, for example.

When there is a steep edge or the like in the regions of interest ra and rb, and hence the pixel values vary significantly in the regions of interest ra and rb, the minimum value of the sums of absolute differences SAD tends to be large even though the unnecessary component is not generated in the regions of interest ra and rb. Moreover, as the contrast of the image in the regions of interest ra and rb becomes higher, the difference between the pixel values of the region of interest ra and the pixel values of the region of interest rb becomes larger, and hence the sum of absolute differences SAD tends to become larger. Moreover, when a difference is generated between the signal obtained by the first pixel G1 and the signal obtained by the second pixel G2 due to an angle of light entering the microlens ML, as an intensity of the light becomes higher, the difference becomes larger, and hence the sum of absolute differences SAD becomes larger. Therefore, the threshold value THR may be set based on the contrast CNT and the average value AVR to contribute to prevention of false detection of the unnecessary component generating region GST. When the ISO sensitivity at the time when the image is taken is high, the sum of absolute differences SAD between the first region of interest ra and the second region of interest rb is large due to effects of noise. Therefore, the offset OFS is set as appropriate based on the ISO sensitivity at the time when the image is taken. The adjustment factor K is set based on a result of simulation or an experiment, for example. As described above, in the first embodiment, the minimum value of the sums of absolute differences SAD may be compared with the threshold value THR to detect the unnecessary component generating region GST.

Figure 12D:
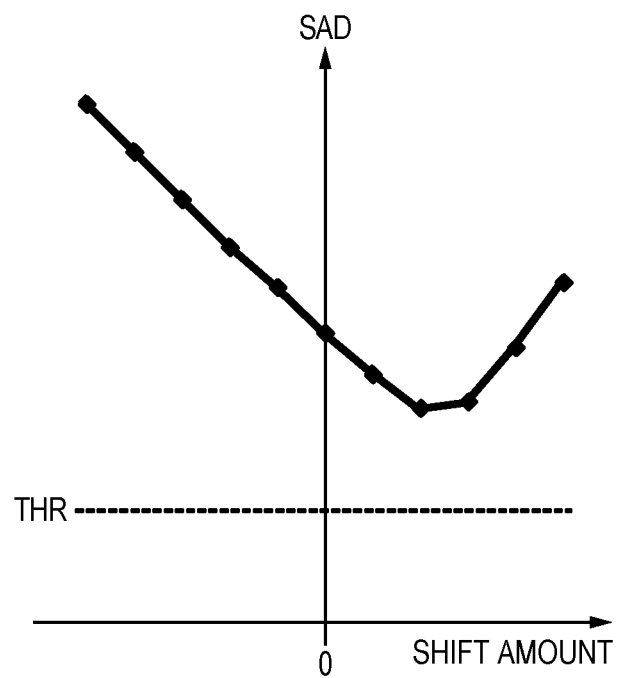

Here, there has been described, as an example, the case where the region in which the difference caused by the unnecessary component is generated between the plurality of viewpoint images 117a and 117b and the region in which the difference caused by the parallax is generated between the plurality of viewpoint images 117a and 117b are different. However, both of the difference caused by the unnecessary component and the difference caused by the parallax may be generated at the same spot. Even when the difference caused by the unnecessary component and the difference caused by the parallax are generated at the same spot, the unnecessary component generating region GST may be detected in the same manner as described above. In the case where both of the difference caused by the unnecessary component and the difference caused by the parallax are generated at the same spot, a sum of absolute differences SAD obtained by adding the sum of absolute differences SAD illustrated in FIG. 12B and the sum of absolute differences SAD illustrated in FIG. 12C is obtained. In FIG. 12D, there is illustrated an example of a result of calculating the sum of absolute differences SAD when both of the difference caused by the unnecessary component and the difference caused by the parallax are generated at the same spot. As illustrated in FIG. 12D, the sum of absolute differences SAD varies depending on the shift amount of the second region of interest rb, but the minimum value of the sums of absolute differences SAD does not fall below the threshold value THR. Therefore, the minimum value of the sums of absolute differences SAD may be compared with the threshold value THR to detect the unnecessary component generating region GST. In other words, as described above, even when the second region of interest rb is shifted within the predetermined range, and when the sum of absolute differences SAD does not fall below the threshold value THR, it may be determined that the first pixel of interest pa is located within the unnecessary component generating region GST.

Figure 13:
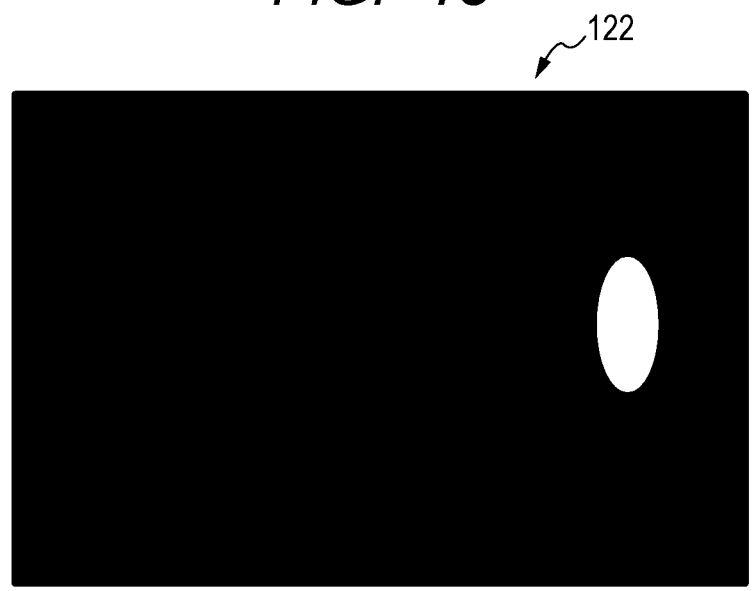
FIG. 13 is a diagram for illustrating a reduced intensity value map.

FIG. 13 is a diagram for illustrating a reduced intensity value map 122. The unnecessary component generating region GST, that is, a portion in which the reduced intensity value DEC(x,y) is 255 is shown in white in FIG. 13. The region in which the unnecessary component is not generated, that is, a portion in which the reduced intensity value DEC(x,y) is 0 is shown in black in FIG. 13.

In Step S306, the image processing unit 104 smooths the reduced intensity value DEC(x,y). The image processing unit 104 applies a general smoothing filter or the like to the reduced intensity value map 122 so that the reduced intensity value is gradually changed at a boundary between the unnecessary component generating region GST and the region in which the unnecessary component is not generated. As a result, a smoothed reduced intensity value DEC'(x,y) is obtained.

In Step S204, the image processing unit 104 performs the processing of reducing the unnecessary component on the image 117 taken by photography. An image G(x,y) taken by photography is an image generated from the combined signal of the first image signal acquired by the first pixels G1 and the second image signal acquired by the second pixels G2. When the processing of reducing the unnecessary component is performed, the reduced intensity value obtained in Step S306, that is, the smoothed reduced intensity value DEC'(x,y) is used. The processing of reducing the unnecessary component is expressed by the following expression (5), for example. In the expression (5), G(x,y) represents an image taken by photography, and G'(x,y) represents an image on which the processing of reducing the unnecessary component has been performed.

$$G'(x,y) = G(x,y) - \text{DIFF}(x,y) \times \text{DEC}'(x,y)/255 \quad (5)$$

The processing of reducing the unnecessary component is selectively performed on the unnecessary component generating region GST of the image taken by photography. The processing of reducing the unnecessary component is performed using the smoothed reduced intensity value DEC'(x,y), and hence, more precisely, this processing is performed on the unnecessary component generating region GST and the vicinity of the unnecessary component generating region GST.

Figure 14:
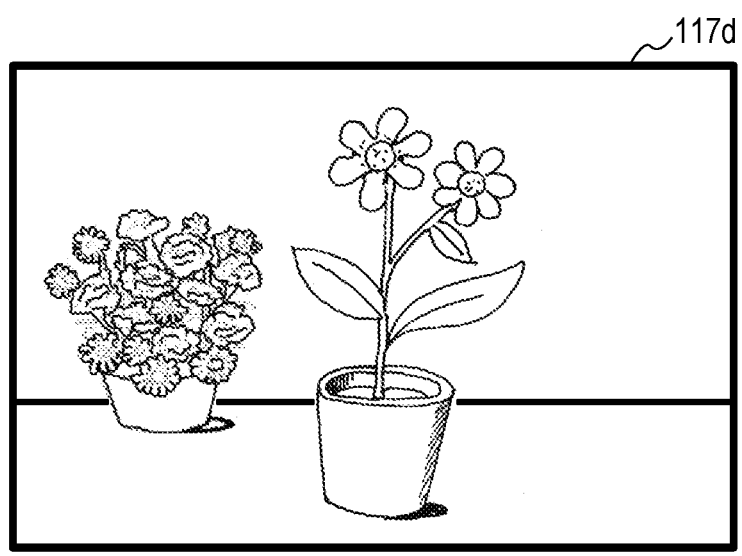
FIG. 14 is a diagram for illustrating an image in which an unnecessary component is reduced.

FIG. 14 is a diagram for illustrating an image in which the unnecessary component is reduced. As illustrated in FIG. 14, in an image 117d in which the unnecessary component has been reduced, the unnecessary component, that is, ghost or the like is sufficiently reduced. In the first embodiment, the unnecessary component is reduced using the reduced intensity value that is gradually changed at the boundary between the unnecessary component generating region GST and the region in which the unnecessary component is not generated, that is, the smoothed reduced intensity value. Therefore, according to the first embodiment, occurrence of unnaturalness in the image can be prevented at the boundary between the region in which the processing of reducing the unnecessary component has been performed and the region in which the processing of reducing the unnecessary component has not been performed.

As described above, in the first embodiment, the unnecessary component generating region GST is detected based on the plurality of correlation values between the first region of interest ra in the first viewpoint image 117a and the plurality of second regions of interest rb in the second viewpoint image 117b. According to the first embodiment, the unnecessary component, for example, ghost or flare, may be reduced satisfactorily without generating a large processing load. In addition, according to the first embodiment, the unnecessary component is reduced so that the degree of reduction of the unnecessary component is gradually changed at the boundary between the unnecessary component generating region GST and the unnecessary component non-generating region, which is the region in which the unnecessary component is not generated. Therefore, according to the first embodiment, the occurrence of unnaturalness can be prevented in the image in which the unnecessary component has been removed.

[Second Embodiment]

An image processing apparatus and an image processing method according to a second embodiment of this disclosure are described with reference to FIG. 15 to FIG. 20. The same constituent elements as those of the image processing apparatus and the image processing method according to the first embodiment, which are illustrated in FIG. 1 to FIG. 14, are denoted by the same reference symbols, and a description thereof is omitted or simplified.

Figure 15:
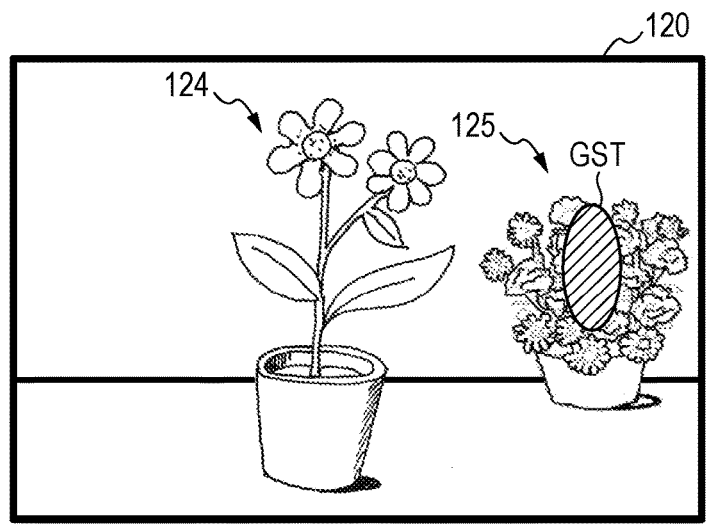
FIG. 15 is a diagram for illustrating an example of an image taken by photography.

FIG. 15 is a diagram for illustrating an example of an image taken by photography. The image illustrated in FIG. 15 is generated by the combined signal obtained by combining the image signal acquired by the first pixels G1 and the image signal acquired by the second pixels G2, for example. As illustrated in FIG. 15, in an image 120, objects 124 and 125, that is, flowers are arranged in the front center and in the back right, respectively. Moreover, in the image 120, there is an unnecessary component generating region GST. The unnecessary component generating region GST overlaps with the object 125. The object 124 in the front of the two objects 124 and 125 included in the image 120 illustrated in FIG. 15 is in focus, and hence the difference corresponding to the parallax does not appear conspicuously between the plurality of viewpoint images in a portion corresponding to the object 124. Meanwhile, the object 125 located in the back right of the two objects 124 and 125 included in the image 120 illustrated in FIG. 15 is out of focus, and hence the difference corresponding to the parallax appears conspicuously between the plurality of viewpoint images in a portion corresponding to the object 125. In FIG. 15, the unnecessary component generating region GST is located at a spot at which the difference corresponding to the parallax appears conspicuously between the viewpoint images. In such case, when the image processing is simply performed by the image processing method according to the first embodiment described above, the image may be degraded at the spot. The image processing apparatus according to the second embodiment is capable of suppressing such degradation of the image.

Figure 16A:
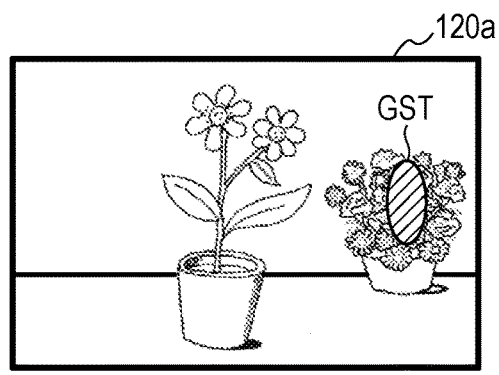
FIG. 16A and FIG. 16B are diagrams for illustrating examples of viewpoint images.
Figure 16B:
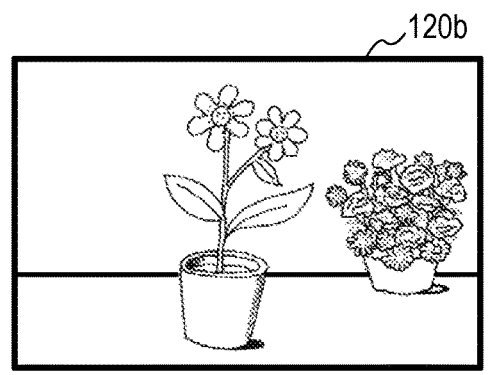

FIG. 16A and FIG. 16B are diagrams for illustrating examples of viewpoint images. In FIG. 16A, a first viewpoint image 120a is illustrated, and in FIG. 16B, a second viewpoint image 120b is illustrated. The first viewpoint image 120a illustrated in FIG. 16A is a viewpoint image obtained by photoelectrically converting the light fluxes that pass through the first pupil region P1 by the first pixel group formed of the plurality of first pixels G1. As described above, the unnecessary light 121 reaches the first pixel G1. Therefore, the first viewpoint image 120a illustrated in FIG. 16A includes the unnecessary component generating region GST. Meanwhile, the second viewpoint image 120b illustrated in FIG. 16B is an image obtained by photoelectrically converting the light fluxes that pass through the second pupil region P2 by the second pixel group formed of the plurality of second pixels G2. As described above, the unnecessary light 121 does not reach the second pixel G2. Therefore, the second viewpoint image 120b illustrated in FIG. 16B does not include the unnecessary component generating region GST. The first pixel G1 and the second pixel G2 are arranged to be adjacent to each other in a horizontal direction, and hence parallax in the left-and-right direction is generated between the first viewpoint image 120a illustrated in FIG. 16A and the second viewpoint image 120b illustrated in FIG. 16B. Moreover, here, there is described, as an example, a case where the number of unnecessary component generating regions GST is one, but the unnecessary component generating regions GST may be present at a plurality of spots in an image. Moreover, the unnecessary component generating regions GST may overlap with each other in an image. There are a difference corresponding to the unnecessary component and a difference corresponding to the parallax between the first viewpoint image 120a and the second viewpoint image 120b.

Figure 17:
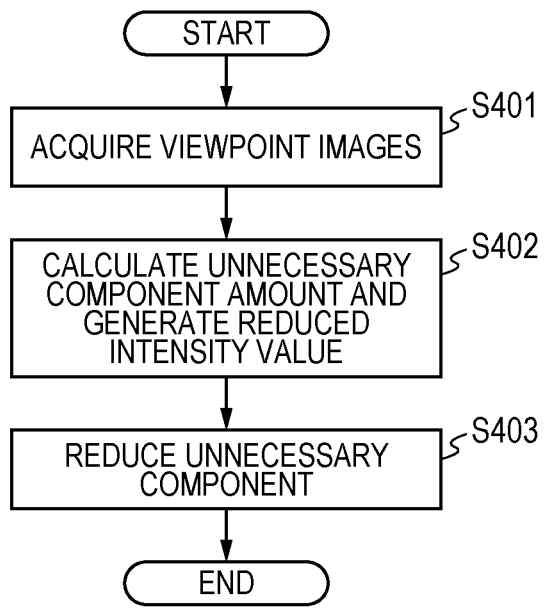
FIG. 17 is a flow chart for illustrating an operation of an image processing apparatus according to a second embodiment of this disclosure.

FIG. 17 is a flow chart for illustrating an operation of the image processing apparatus according to the second embodiment.

In Step S401, the image processing unit 104 acquires the plurality of viewpoint images having parallax therebetween, that is, the first viewpoint image 120a and the second viewpoint image 120b. The image processing unit 104 performs general development processing and various kinds of correction processing on each of the first viewpoint image 120a and the second viewpoint image 120b.

Figure 19:
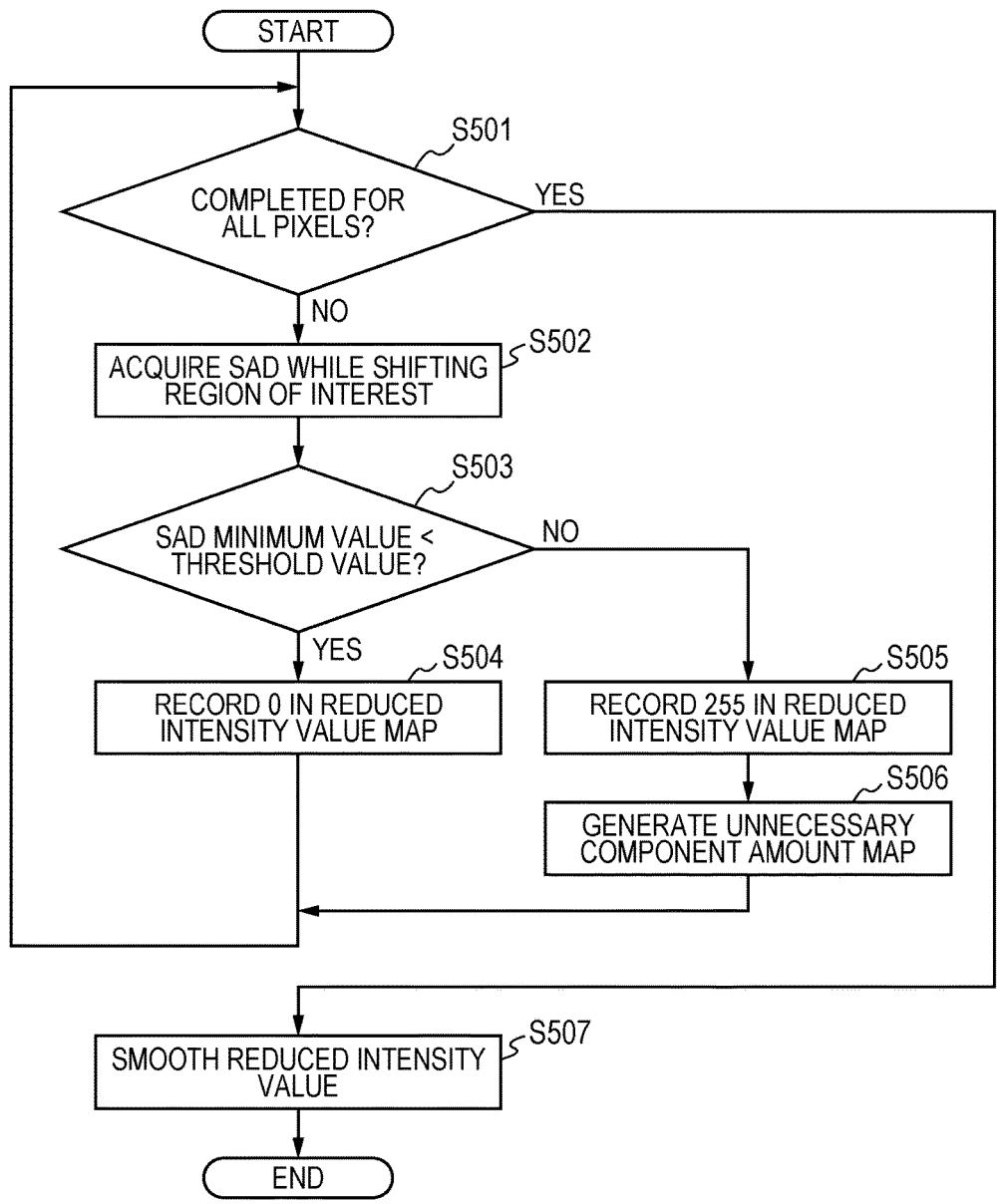
FIG. 19 is a flow chart for illustrating an operation of the image processing apparatus according to the second embodiment.

In Step S402, the image processing unit 104 calculates an unnecessary component amount and generates a reduced intensity value. FIG. 19 is a flow chart for illustrating an operation of the image processing apparatus according to the second embodiment. In FIG. 19, there is illustrated processing of performing the calculation of the unnecessary component amount and the generation of the reduced intensity value. Step S501 to Step S505 illustrated in FIG. 19 are the same as Step S301 to Step S305 described above with reference to FIG. 10, and hence a description thereof is omitted.

In Step S506, the image processing unit 104 generates an unnecessary component amount map. The unnecessary component amount map is obtained by two-dimensionally mapping an unnecessary component amount GHOST(x,y) for each first pixel of interest pa. A pixel value at each set of coordinates of the first viewpoint image 120a is represented by A(x,y), a pixel value of each pixel of the second viewpoint image 120b is represented by B(x,y), and the shift amount of the second region of interest rb at the time when the sum of absolute differences SAD is minimized, that is, the correlation value is maximized is represented by d. The unnecessary component amount GHOST(x,y) at each pixel is expressed by the following expressions.

Specifically, when $A(x,y) \geq B(x+d, y+d)$, $$GHOST(x,y) = A(x,y) - B(x+d, y+d) \quad (6), \text{ and}$$

when $A(x,y) < B(x+d, y+d)$, $$GHOST(x+d, y+d) = B(x+d, y+d) - A(x,y) \quad (7).$$

Figure 18:
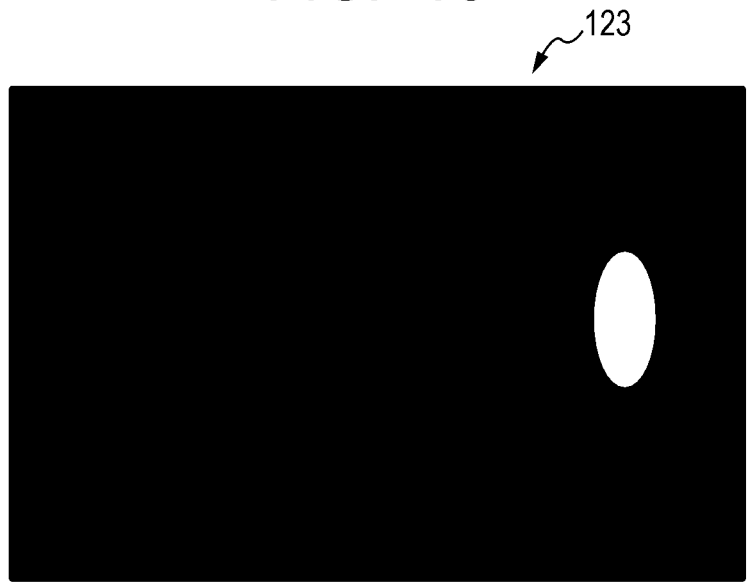
FIG. 18 is a diagram for illustrating an unnecessary component amount map.

FIG. 18 is a diagram for illustrating an unnecessary component amount map 123. The region in which the unnecessary component is not generated, that is, a portion in which the unnecessary component amount GHOST(x,y) is 0 is shown in black in FIG. 18. In the unnecessary component generating region GST, the unnecessary component amount GHOST(x,y) at each set of coordinates takes a value corresponding to an unnecessary component amount. The unnecessary component amount map 123 thus obtained is stored in the storage unit 108, for example.

The shift amount d of the second region of interest rb at the time when the sum of absolute differences SAD is minimized is not limited to an integer multiple of the size of the unit pixel 115. Based on a change in sum of absolute differences SAD with a change in shift amount d as illustrated in FIG. 12D, the shift amount of the second region of interest rb with which the sum of absolute differences SAD is minimized may be estimated with an accuracy that is finer than the size of the unit pixel 115. Moreover, as illustrated in FIG. 12B, when the sum of absolute differences SAD is hardly changed when the second region of interest rb is shifted within the predetermined range, it is considered that a large difference corresponding to the parallax is not generated between the plurality of viewpoint images 120a and 120b at the spot. Therefore, in such case, the shift amount d of the second region of interest rb at the time when the sum of absolute differences SAD is minimized may be treated as 0.

In Step S507, as in Step S306 described above with reference to FIG. 10, the image processing unit 104 smooths a reduced intensity value DEC(x,y). In other words, the image processing unit 104 applies a general smoothing filter or the like to the reduced intensity value map so that the reduced intensity value is gradually changed at a boundary between the unnecessary component generating region GST and the region in which the unnecessary component is not generated. As a result, a smoothed reduced intensity value DEC'(x,y) is obtained.

In Step S403, the image processing unit 104 performs processing of reducing the unnecessary component on an image G(x,y) taken by photography. The image G(x,y) taken by photography is an image generated from the combined signal of the first image signal acquired by the first pixels G1 and the second image signal acquired by the second pixels G2. When the processing of reducing the unnecessary component is performed, the reduced intensity value obtained in Step S507, that is, the smoothed reduced intensity value DEC'(x,y) is used. The processing of reducing the unnecessary component is expressed by the following expression (8), for example. In the expression (8), G(x,y) represents an image taken by photography, and G'(x,y) represents an image on which the processing of reducing the unnecessary component has been performed.

$$G'(x,y) = G(x,y) - GHOST(x,y) \times DEC'(x,y)/255 \quad (8)$$

In this manner, the image processing unit 104 reduces the unnecessary component based on the difference between the first viewpoint image 120a and the second viewpoint image 120b at the time when the correlation value is maximized. The processing of reducing the unnecessary component is selectively performed on the unnecessary component generating region GST of the image taken by the photography. The processing of reducing the unnecessary component is performed using the smoothed reduced intensity value DEC'(x,y), and hence, more precisely, this processing is performed on the unnecessary component generating region GST and the vicinity of the unnecessary component generating region GST.

Figure 20:
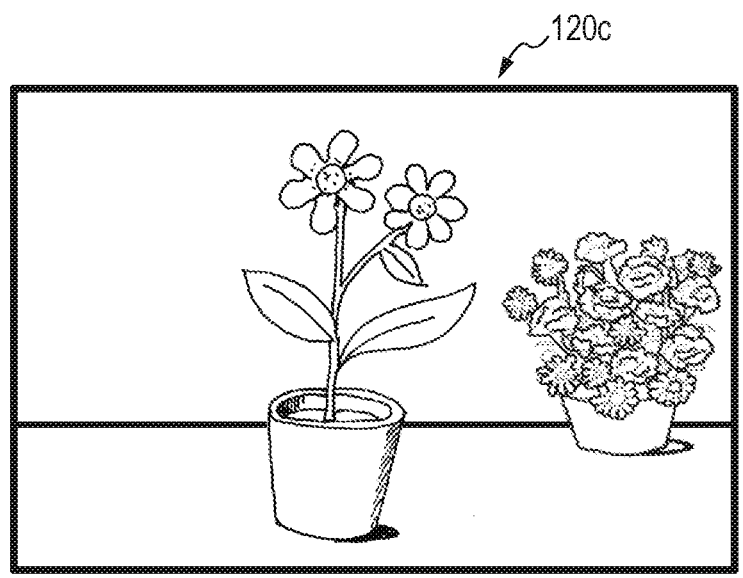
FIG. 20 is a diagram for illustrating an image in which an unnecessary component is reduced.

FIG. 20 is a diagram for illustrating an image in which the unnecessary component is reduced. As illustrated in FIG. 20, in an image 120c in which the unnecessary component is reduced, the unnecessary component, that is, ghost or the like is sufficiently reduced.

As described above, in the second embodiment, the unnecessary component is reduced based on the difference GHOST(x,y) between the first viewpoint image 120a and the second viewpoint image 120b at the time when the correlation value between the first region of interest ra and the second region of interest rb is maximized. Therefore, according to the second embodiment, a good image in which the unnecessary component is reduced can be obtained even when the spot at which the difference corresponding to the parallax appears conspicuously and the unnecessary component generating region GST overlap with each other.

[Other Embodiments]

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, in the above-mentioned first and second embodiments, there has been described, as an example, the case where the image processing apparatus 100 is an image pickup apparatus, but the image processing apparatus 100 is not limited to the image pickup apparatus. For example, the image processing apparatus 100 may be a personal computer (PC), or a smart phone, which is an electronic device having both the function of a personal digital assistant (PDA) and the function of a mobile phone. Alternatively, the image processing apparatus 100 may be a tablet terminal, a personal digital assistant (PDA), an image viewer, a digital photo frame, or an electronic book reader, for example.

This application claims the benefit of Japanese Patent Application No. 2016-185868, filed Sep. 23, 2016, which is hereby incorporated by reference herein in its entirety.

What is claimed is:

1. An image processing apparatus, comprising:
one or more processors; and
a memory storing instructions which, when the instructions are executed by the processors, cause the image processing apparatus to function as:
a detection unit configured to detect an unnecessary component generating region, which is a region of an image in which an unnecessary component is generated, based on a first viewpoint image and a second viewpoint image with different viewpoints, the image being obtained by combining the first viewpoint image and the second viewpoint image, the detection unit being configured to detect the unnecessary component generating region based on a plurality of correlation values between a first region of interest in the first viewpoint image and a plurality of second regions of interest in the second viewpoint image; and
a reduction unit configured to perform processing of reducing the unnecessary component,
wherein the detection unit is configured to detect the unnecessary component generating region based on comparison between of the plurality of correlation values and a threshold value.

2. The image processing apparatus according to claim 1, wherein the detection unit is configured to detect the unnecessary component generating region based on the first viewpoint image and the second viewpoint image that are not corrected for an image shift, which is generated between the first viewpoint image and the second viewpoint image.

3. The image processing apparatus according to claim 1, wherein the plurality of second regions of interest are set by sequentially shifting one of the plurality of second regions of interest in a predetermined range including a region corresponding to the first region of interest.

4. The image processing apparatus according to claim 1, wherein the correlation value is a sum of absolute differences between a portion located in the first region of interest of the first viewpoint image and a portion located in each of the plurality of second regions of interest of the second viewpoint image.

5. The image processing apparatus according to claim 1, wherein the threshold value is set based on a contrast in the first region of interest.

6. The image processing apparatus according to claim 1, wherein the threshold value is set based on an average value of pixel values in the first region of interest.

7. The image processing apparatus according to claim 1, wherein the threshold value is set based on an ISO sensitivity at a time of photography.

8. The image processing apparatus according to claim 1, wherein the reduction unit is configured to reduce the unnecessary component so that a degree of reduction of the unnecessary component is gradually changed at a boundary between the unnecessary component generating region and an unnecessary component non-generating region, which is a region in which the unnecessary component is not generated.

9. The image processing apparatus according to claim 1, wherein the reduction unit is configured to reduce the unnecessary component based on a difference between the first viewpoint image and the second viewpoint image at a time when one of the plurality of correlation values is maximized.

10. The image processing apparatus according to claim 1, wherein the reduction unit is configured to selectively perform the processing of reducing the unnecessary component on the unnecessary component generating region.

11. An image processing method, comprising:
detecting an unnecessary component generating region, which is a region of an image in which an unnecessary component is generated, based on a first viewpoint image and a second viewpoint image with different viewpoints, the image being obtained by combining the first viewpoint image and the second viewpoint image, the unnecessary component generating region being detected based on a plurality of correlation values between a first region of interest in the first viewpoint image and a plurality of second regions of interest in the second viewpoint image, which are located in a vicinity of a region corresponding to the first region of interest; and
performing processing of reducing the unnecessary component,
wherein the detection of the unnecessary component generating region is based on comparison between each of the plurality of correlation values and a threshold value.

12. A non-transitory computer-readable storage medium having stored thereon a program for causing a computer to execute:
detecting an unnecessary component generating region, which is a region of an image it which an unnecessary component is generated, based on a first viewpoint image and a second viewpoint image with different viewpoints, the image being obtained by combining the first viewpoint image and the second viewpoint image, the unnecessary component generating region being detected based on a plurality of correlation values between a first region of interest in the first viewpoint image and a plurality of second regions of interest in the second viewpoint image, which are located in a vicinity of a region corresponding to the first region of interest; and
performing processing of reducing the unnecessary component,
wherein the detection of the unnecessary component generating region is based on comparison between each of the plurality of correlation values and a threshold value.

13. An image processing apparatus, comprising:
one or more processors; and
a memory storing instructions which, when the instructions are executed by the processors, cause the image processing apparatus to function as:
a detection unit configured to detect an unnecessary component generating region, which is a region of an image in which an unnecessary component is generated, based on a first viewpoint image and a second viewpoint image with different viewpoints, the image being obtained by combining the first viewpoint image and the second viewpoint image, the detection unit being configured to detect the unnecessary component generating region based on a plurality of correlation values between a first region of interest in the first viewpoint image and a plurality of second regions of interest in the second viewpoint image; and a reduction unit configured to perform processing of reducing the unnecessary component, wherein the detection unit is configured to detect the unnecessary component generating region based on the first viewpoint image and the second viewpoint image that are not corrected for an image shift, which is generated between the first viewpoint image and the second viewpoint image.

* * * * *